United States Patent [19]

Fox et al.

[11] Patent Number: 4,608,626
[45] Date of Patent: Aug. 26, 1986

[54] ELECTRICAL INVERTER WITH MINORITY POLE CURRENT LIMITING

[75] Inventors: David A. Fox, Shawnee Township, Gallatin County; Donal E. Baker, American Township, Allen County, both of Ohio

[73] Assignee: Westinghouse Electric Corp., Pittsburgh, Pa.

[21] Appl. No.: 670,420

[22] Filed: Nov. 9, 1984

[51] Int. Cl.$^4$ ............................................. H02H 7/122
[52] U.S. Cl. ............................................. 363/56; 363/41
[58] Field of Search ........................... 363/41, 56, 58; 323/910; 361/77, 87, 93

[56] References Cited

U.S. PATENT DOCUMENTS

| | | | |
|---|---|---|---|
| 3,683,264 | 8/1972 | Schieman et al. | 363/96 X |
| 3,733,537 | 5/1973 | Kernick et al. | |
| 4,291,265 | 9/1981 | Kawada et al. | 318/782 |
| 4,314,191 | 2/1982 | Kawada et al. | 318/802 |
| 4,410,935 | 10/1983 | Dang | 363/56 X |
| 4,546,422 | 10/1985 | Okado | 363/56 X |

FOREIGN PATENT DOCUMENTS

| | | | |
|---|---|---|---|
| 0081133 | 6/1983 | European Pat. Off. | 363/41 |
| 568130 | 8/1977 | U.S.S.R. | 363/41 |

Primary Examiner—Patrick R. Salce
Assistant Examiner—Marc S. Hoff
Attorney, Agent, or Firm—R. P. Lenart

[57] ABSTRACT

A current limiting circuit for a DC to AC inverter is provided with means for sensing the current in the inverter output phases and means for switching all of the power poles to the polarity of the minority power pole when an overcurrent condition occurs. This reduces the switching current levels of the inverter power pole switches to reduce switching stresses and improve reliability. A current sensing scheme is illustrated in which self-excited transductors are used to sense the current in two of the three inverter output phases and the current in the remaining output phase is derived from these two sensed currents.

8 Claims, 5 Drawing Figures

ELECTRICAL INVERTER WITH MINORITY POLE CURRENT LIMITING

BACKGROUND OF THE INVENTION

This invention relates to electrical inverters and more particularly to such inverters which convert a DC input to a multiple phase AC output.

Variable speed constant frequency (VSCF) electrical power supplies have been utilized where a constant frequency voltage is required to be derived from a prime mover which operates at a variable speed. For example, VSCF systems have been utilized in aircraft where 400 hertz power must be derived from a generator which is driven at a speed that is determined by the speed of an associated aircraft engine. One type of VSCF system employs a variable speed generator which delivers a DC voltage to a pair of DC link conductors. An inverter converts this DC voltage to a constant frequency multiple phase AC output.

Transistorized DC link inverters generally operate their power pole switching transistors near the limit of their current ratings. Consequently, these inverters require individual phase or pole current limiting to protect the switching transistors. When an overcurrent is sensed in a particular pole, action must be taken to limit the current. Two methods of current limiting are presently used. In the first method, the transistor switch in the pole with the excess current is turned off. This causes the current to flow through a commutating diode connected in parallel with one of the switching transistors and causes the pole voltage to reverse, thereby forcing the current to reduce at a rate controlled by an output filter inductor. The second method of current limiting senses the polarity of the excess current in each pole and reverses the pole which is subject to an excess current to force the current down. The current in the switched pole transfers to the opposite commutating diode exactly like the first method, since the opposite switching transistor will not conduct current in the reverse direction.

One method for sensing phase current is illustrated in U.S. Pat. No. 3,733,537, issued May 15, 1973 to Kernick et al. The current sensing circuit illustrated in that patent uses two current transformer coils in each output phase conductor. The current transformer coils are connected in a circuit known as a self-excited transductor. This circuit prevents loss of sensitivity in the presence of DC currents, which can develop during current limiting. The two described methods of current limiting both require six current transformers and both switch the pole transistors carrying the most current.

SUMMARY OF THE INVENTION

The present invention seeks to reduce the number of required current transformers to reduce the size, weight and cost of the system, and also to reduce the current switching levels of the power transistors to improve reliability. A current limiting circuit for an inverter having three output power poles which are capable of being alternatively switched between a first DC voltage level and a second DC voltage level, wherein each of the power poles is connected to an output phase conductor, which is constructed in accordance with the present invention comprises:

means for producing a signal which is representative of the current magnitude in each output phase conductor;

means for comparing each of these signals with a reference voltage level; and means for switching all of the power poles to a first one of the DC voltage levels when one of the signals exceeds the reference voltage level, wherein the first DC voltage level is the DC voltage level of the power pole corresponding to the signal which exceeds the reference voltage level.

Inverters which include the current limiting circuit of this invention limit current by a method which includes the steps of:

generating a signal representative of an overcurrent condition in a first one of this output phase conductors; and switching the power poles associated with the other phase conductors to the same DC voltage level as the power pole associated with the first phase conductor which is subject to the overcurrent condition.

DESCRIPTION OF THE PREFERRED EMBODIMENTS

Figure 1:
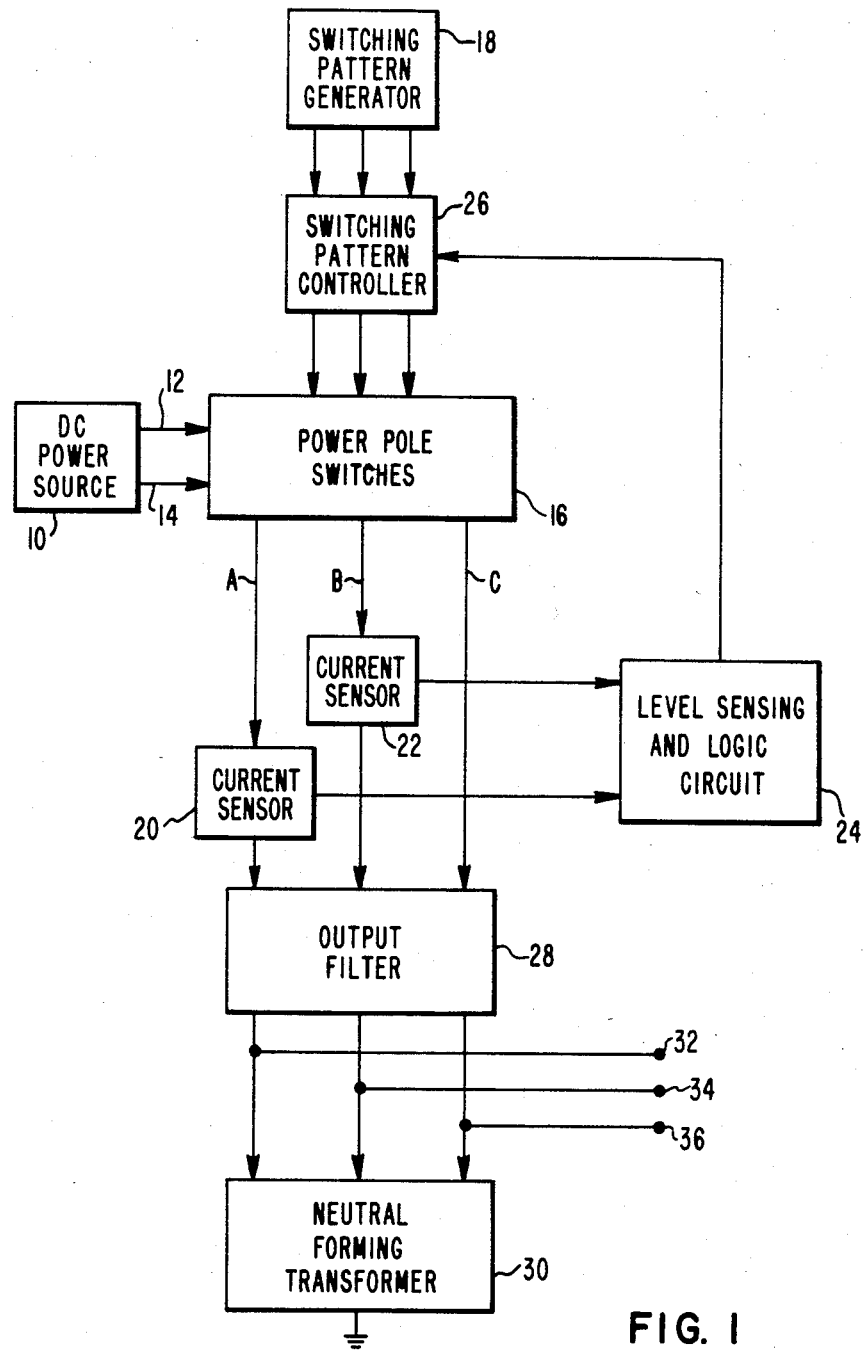
FIG. 1 is a block diagram of an inverter power system including a current limiting circuit constructed in accordance with the present invention.

Referring to the drawings, FIG. 1 is a block diagram of an inverter power system which includes the minority pole current limiting circuit of the present invention. In this system, a DC power source 10 produces a DC voltage on a pair of DC link conductors 12 and 14. A plurality of power pole switches 16 are operated in accordance with a switching pattern produced by switching pattern generator 18 to alternately switch the three output phases A, B and C to the voltage level appearing on either one of the DC link conductors 12 and 14.

In a DC link inverter with a fixed switching pattern such as used on a typical VSCF system, the power poles are either high or low. That is, each pole is either connected to the positive link DC bus or the negative link bus. No off-time is theoretically available so that the power poles are never open. In a three phase system, it is apparent that at any given time, two poles must be at one polarity with a third pole at the opposite polarity; or all three poles must be at the same polarity. When all three poles are at the same polarity, the load currents and output voltages are decaying towards zero. The present invention, therefore, provides the desired output current limiting by switching all poles to the same polarity. This condition should remain as long as the overcurrent condition persists.

Current sensors 20 and 22 serve as means for producing a signal representative of the current magnitude in each of their associated output phase conductors. These current signals are transmitted to a level sensing and logic circuit which derives a signal representative of the current flowing though the third phase conductor and compares each of these signals with a reference voltage level. If any of the signals exceeds the reference voltage level, the switching pattern controller 26 is directed to modify the power pole switching pattern such that all power pole switches are switched to the same polarity as the power pole which is experiencing the overcurrent condition, that is, the minority pole. It should be apparent that in the system of FIG. 1, before the output filter 28 and the neutral forming transformer 30, the system is a three wire system wherein the sum of the three pole currents must always equal zero. The present invention takes advantage of this fact to eliminate the need for a current sensing circuit in all three of the output phase conductors. In the system of FIG. 1, output terminals 32, 34 and 36 are used to connect the inverter power system to an external load.

Figure 2:
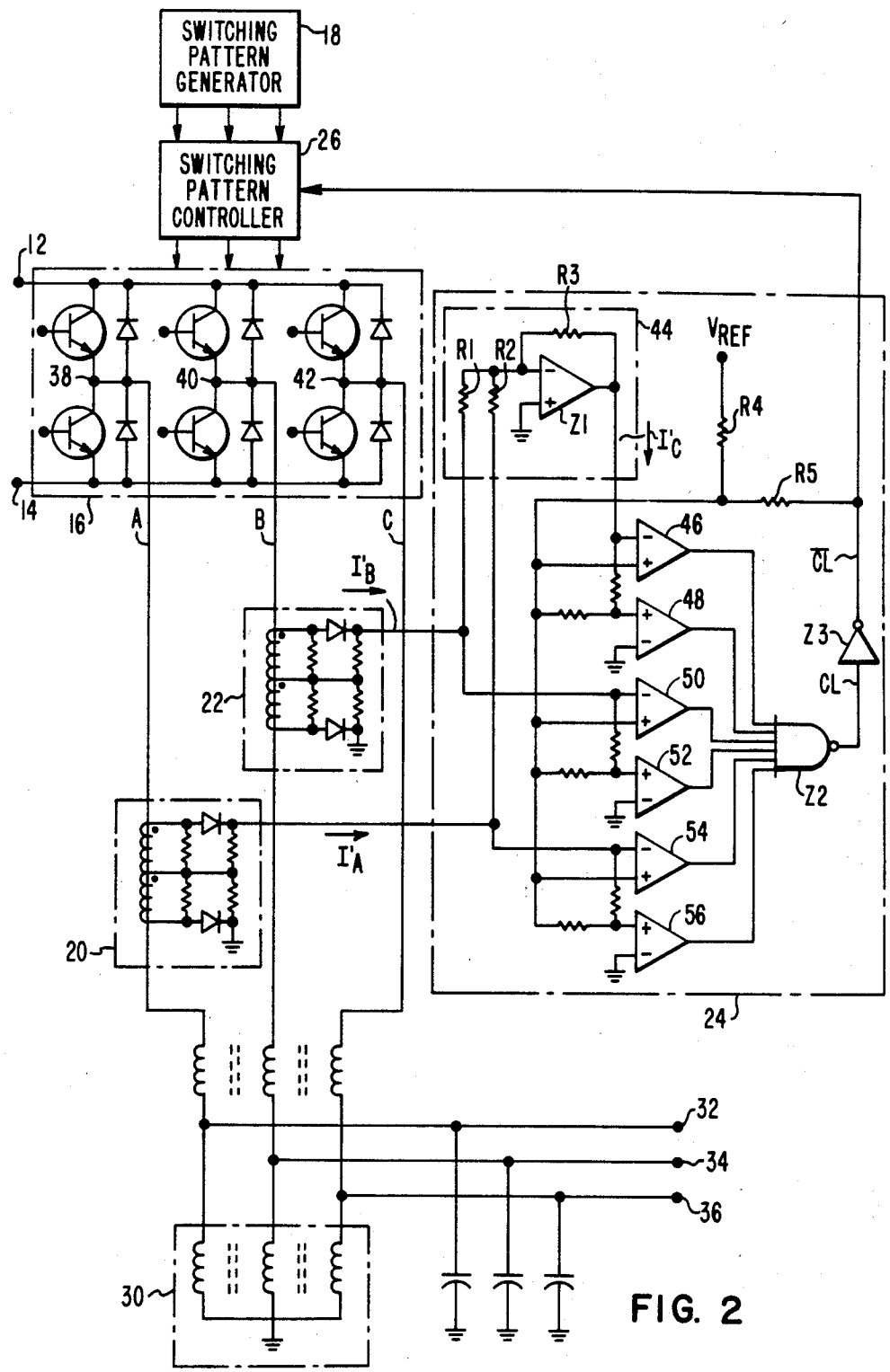
FIG. 2 is a schematic diagram of the inverter power system of FIG. 1.

FIG. 2 is a schematic drawing of the inverter power system of FIG. 1. This figure shows that two transistor switches are associated with each power pole 38, 40 and 42. Each of these power transistor switches is connected in parallel with a commutating diode. Transductors 20 and 22 each include a pair of transformer coils and a resistor-diode network. The outputs of these transductors, I'$_A$ and I'$_B$, are fed to a plurality of comparator circuits and to a summing circuit 44 containing three equal resistors R1, R2 and R3 and an operational amplifier Z1 connected such that the output of the summing circuit I'$_C$ is a signal representative of the current flowing in phase conductor C. The six comparators 46, 48, 50, 52, 54 and 56 of the level sensing and logic circuit 24 are used to detect excess positive or negative levels on the current signals I'$_A$, I'$_B$ and I'$_C$. A reference voltage is supplied on terminal V$_{ref}$ to establish a reference signal level such that a current signal above the reference level will cause a comparator to go low, causing a logic 1 to appear at the output of gate Z2. Thus current limit signal CL is inverted by inverter Z3 to produce the $\overline{CL}$ output. Resistors R4 and R5 can be adjusted to cause a slight shift in the current reference limit applied to the comparators, to provide any desired level of hysteresis.

Figure 3:
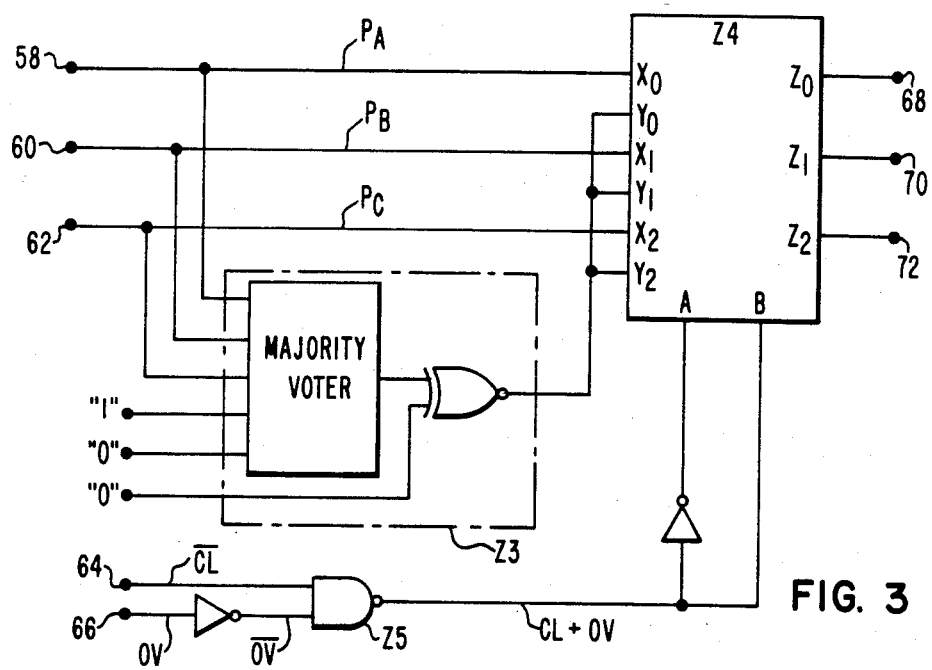
FIG. 3 is a schematic diagram of the switching pattern control circuit of the system of FIG. 1.

FIG. 3 is a schematic diagram of the switching pattern controller 26 of FIGS. 1 and 2. Signals P$_A$, P$_B$ and P$_C$ are the switching pattern control signals produced on terminals 58, 60 and 62 by the switching pattern generator 18 of FIGS. 1 and 2. Gate Z3 is a majority voter gate with an inverter, for example MC14530B, connected to form a minority voter, that is, the output is equal to the polarity of the odd pole of the inverter output circuit. Gate Z4 is a multiplexer or data selector, for example MC14519B, connected to pass signals P$_A$, P$_B$ and P$_C$ to the output terminals 68, 70 and 72 under normal conditions, that is, when input A is high and input B is low. However, under abnormal conditions, with an inverted current limit signal $\overline{CL}$ on terminal 64, input B goes high, input A goes low, and gate Z4 modifies the switching patterns such that all power poles are switched to the polarity of the minority pole.

Switching all poles to the same polarity develops zero voltage at the pole outputs. This is also the desired response to an over-voltage condition. Therefore, the circuit of FIGS. 2 and 3 may be used to implement the VSCF ceiling voltage control disclosed in commonly assigned co-pending application Ser. No. 604,689, filed Apr. 27, 1984 and entitled "Variable Speed Constant Frequency Power Supply With Ceiling Voltage Control", now abandoned by adding gate Z5 as shown in FIG. 3. Gate Z5 causes the switching operation to occure when either a current limiting signal $\overline{CL}$ appears on terminal 64 or an over-voltage signal OV appears on terminal 66.

Figure 4:
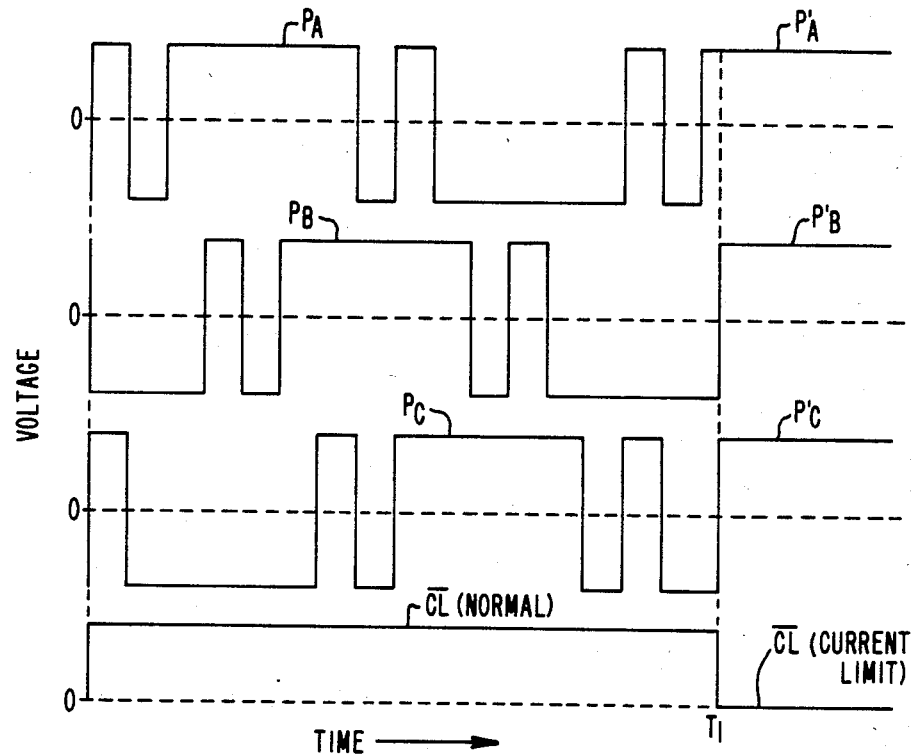
FIG. 4 is a series of waveforms which illustrate the switching pattern signals of the present invention.

FIG. 4 is a series of waveforms which illustrate the operation of the present invention. Switching pattern waveforms P$_A$, P$_B$ and P$_C$ normally appear at the outputs 68, 70 and 72 in FIG. 3. However, when an overcurrent condition occurs at time T$_1$, these switching patterns are modified to become P'$_A$, P'$_B$ and P'$_C$ such that all poles assume the polarity of the previous minority pole, that is the pole connection to phase conductor A in this example.

Figure 5:
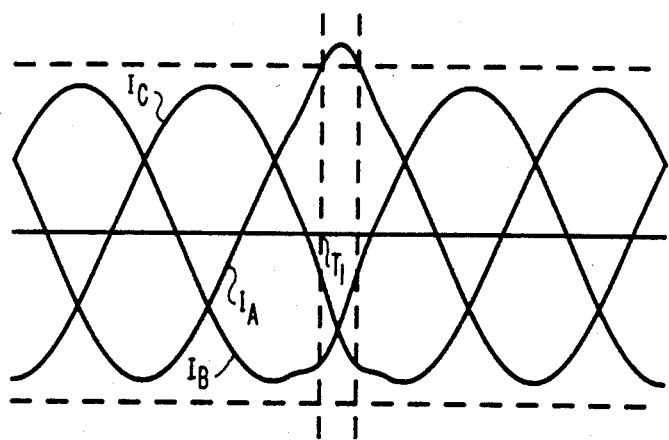
FIG. 5 is a series of current wave forms which illustrate the current limiting operation of the present invention.

FIG. 5 is a series of waveforms wherein the current in-phase conductors A, B and C are represented as I$_A$, I$_B$ and I$_C$, respectively. In this figure it can be seen that when pole current in a particular phase, for example I$_A$, approaches the current limit near its peak value, currents I$_B$ and I$_C$ are nearly equal and approximately 50% of I$_A$. If pole A were switched at this time, the transistors would switch near their maximum current rating. However, this invention causes poles B and C to switch such that the transistors associated with poles B and C need only switch at approximately 50% of their rating. This reduces the transistor stress and improves reliability.

Although the present invention has been described in terms of what are at present believed to be its preferred embodiment, it will be apparent to those skilled in the art that various changes may be made without departing from the scope of the invention. It is, therefore, intended that the appended claims cover all such changes.

What is claimed is:

1. A current limiting circuit for an inverter including three output power poles which are capable of being alternatively switched between a first DC voltage level and a second DC voltage level, wherein each of said power poles is connected to an output phase conductor, said current limiter circuit comprising:
   means for producing a signal representative of the current magnitude in each output phase conductor;
   means for comparing each signal with a reference voltage level;
   means for generating a switching waveform pattern for each of said power poles;
   means for determining the DC voltage level of the minority power pole; and
   means for altering said switching waveform patterns, when one of said signals exceeds the reference voltage level, such that all switching waveform patterns cause their associated power poles to switch to the DC voltage level of the minority power pole.

2. A current limiting circuit as recited in claim 1, wherein said means for producing a signal comprises:
   a first current monitoring circuit for producing a first signal representative of the current magnitude in a first one of said phase conductors;
   a second current monitoring circuit for producing a second signal representative of the current magnitude in a second one of said phase conductors; and
   means for combining said first and second signals to obtain a third signal representative of the current magnitude in a third one of said phase conductors.

3. A current limiting circuit as recited in claim 1, wherein:

said means for determining the DC voltage level of the minority power pole comprises a voting circuit having inputs for receiving each of said switching waveform patterns and producing an output signal having a logic level which is representative of the DC voltage level of the minority power pole; and said means for altering said switching waveform patterns comprises a multiplexer having inputs for receiving each of said switching waveform patterns and for receiving the output signal of said voting circuit, wherein said multiplexer passes said switching waveform patterns under normal conditions, and modifies said switching waveform patterns such that they all assume the logic level of the minority pole switching waveform pattern under overcurrent conditions.

4. A method of limiting output current in an inverter including three output power poles which are capable of being alternately switched between a first DC voltage level and a second DC voltage level, wherein each of said power poles is connected to an output phase conductor, said method comprising the steps of:

producing a switching pattern waveform for each of the power poles;

determining the polarity of the minority power pole;

generating a signal representative of an overcurrent condition in a first one of the phase conductors; and altering said switching pattern waveforms in response to said signal such that the power poles connected to the other two phase conductors switch to the same DC voltage level as the minority power pole.

5. A method of limiting output current in an inverter including three output power poles which are capable of being alternately switched between a first DC voltage level and a second DC voltage level, wherein each of said power poles is connected to an output phase conductor, said method comprising the steps of:

producing a switching pattern waveform for each of the power poles;

determining the polarity of the minority power pole;

sensing the current in two of said output phase conductors;

combining the sensed current to determine the current in the third output phase conductor;

comparing the current in each output phase conductor to a reference level;

generating a signal representative of an overcurrent condition when any of said currents exceeds said reference level; and altering said switching pattern waveforms in response to said signal such that all power poles switch to the same DC voltage level as the minority power pole.

6. An inverter power system comprising:

a DC power source for producing a first DC voltage level on a first DC-link conductor and a second DC voltage level on a second DC-link conductor;

three output power poles;

switching means for alternately connecting each of said power poles to each of said DC-link conductors;

an output phase conductor connected to each of said power poles;

means for producing a signal representative of the current magnitude in each output phase conductor;

means for comparing each signal with a reference voltage level to determine the presence of an overcurrent condition;

means for generating a switching waveform pattern for each of said power poles;

means for determining the DC voltage level of the minority power pole; and means for altering said switching waveform patterns, when one of said signals exceeds the reference voltage level, such that all switching waveform patterns cause their associated power poles to switch to the DC voltage level of the minority power pole.

7. An inverter power system as recited in claim 6, wherein said means for producing a signal comprises:

a first current monitoring circuit for producing a first signal representative of the current magnitude in a first one of said phase conductors;

a second current monitoring circuit for producing a second signal representative of the current magnitude in a second one of said phase conductors; and means for combining said first and second signals to obtain a third signal representative of the current magnitude in a third one of said phase conductors.

8. An inverter power system as recited in claim 6 wherein:

said means for determining the DC voltage level of the minority power pole comprises a voting circuit having inputs for receiving each of said switching waveform patterns and producing an output signal having a logic level which is representative of the DC voltage level of the minority power pole; and said means for altering said switching waveform patterns comprises a multiplexer having inputs for receiving each of said switching waveform patterns and for receiving the output signal of said voting circuit, wherein said multiplexer passes said switching waveform patterns under normal conditions, and modifies said switching waveform patterns such that they all assume the logic level of the minority pole switching waveform pattern under overcurrent conditions.

* * * * *